United States Patent [19]

Folkerth

[11] Patent Number: 4,494,591

[45] Date of Patent: Jan. 22, 1985

[54] TILTING TABLE FOR A WOODWORKING TOOL

[75] Inventor: Harold E. Folkerth, Dayton, Ohio

[73] Assignee: Shopsmith, Inc., Dayton, Ohio

[21] Appl. No.: 531,978

[22] Filed: Sep. 14, 1983

[51] Int. Cl.³ .............................................. B25H 1/00
[52] U.S. Cl. .......................... 144/286 A; 144/286 R; 144/1 C; 403/92; 403/117
[58] Field of Search .................. 144/1 R, 1 C, 286 R, 144/286 A, 287; 403/87, 92, 98, 117'

[56] References Cited

U.S. PATENT DOCUMENTS

| | | | |
|---|---|---|---|
| 2,747,626 | 5/1956 | Goldschmidt | 144/1 R |
| 2,927,612 | 3/1960 | Edgemond, Jr. et al. | 144/1 C |
| 3,282,309 | 11/1966 | Parker et al. | 144/1 R |
| 4,349,945 | 9/1982 | Fox | 144/1 R |

OTHER PUBLICATIONS

R. J. DeCristoforo, "Power Tool Woodworking for Everyone", published by Shopsmith, Inc., Vandalia, Ohio, p. 24.

Primary Examiner—W. D. Bray
Assistant Examiner—Jorji M. Griffin
Attorney, Agent, or Firm—Biebel, French & Nauman

[57] ABSTRACT

A tilting table for a woodworking tool comprising a support member, a pair of trunnions pivotally attached to the support member for movement about a common axis, a table top attached to and supported by the trunnions, a pair of wedge blocks mounted to slidably engage the trunnions and support member, and carried on a rod having a nut threaded thereon such that inward displacement of the nut urges the wedge blocks toward each other, thereby jamming the wedge blocks between the trunnions and the support member. The wedge blocks are spring loaded such that outward displacement of the nut allows the wedge blocks to be urged outwardly from their jamming engagement, thus permitting the table top and trunnions to be pivoted relative to the support member.

27 Claims, 4 Drawing Figures

4,494,591

TILTING TABLE FOR A WOODWORKING TOOL

BACKGROUND OF THE INVENTION

The present invention relates to workpiece supporting surfaces and, more particularly, to tiltable tables for use with woodworking tools.

Most multipurpose woodworking tools are of the type having a headstock which supports an electric motor having a horizontally-oriented output spindle, and a workpiece supporting table. Both the headstock and table are adjustably mounted on a pair of parallel, horizontally extending rails, so that the relative distance between the headstock and table can be varied, as well as their arrangement along the rails. The output spindle of the headstock is adapted to support a circular saw blade or other disk-shaped tool, and the table top includes a generally centrally located, transverse slot sized to receive at least a portion of the saw blade therethrough, so that the assembly may be operated as a table saw.

The headstock and circular saw blade typically are incapable of being pivoted in relation to the horizontally extending rails, so that in order to cut a beveled edge on a workpiece supported on the table, it is necessary to tilt the table so that the workpiece is disposed at an angle relative to the vertically oriented saw blade.

For example, the Edgemond, Jr. et al. U.S. Pat. No. 2,927,612 discloses a multipurpose woodworking tool having a headstock and tilting table mounted on a pair of parallel, horizontally extending rails, and the table top is pivotally mounted to a support member which includes a pair of vertically extending racks that are supported by a carriage mounted on the rails. The tilting mechanism comprises a trunnion, attached to the underside of the table and pivotally attached to the support member, and a pillow block which is also attached to the underside of the table and receives a pivot pin which extends outwardly from an opposite side of the support member. The trunnion includes an arcuate slot, and the support member includes a threaded bolt extending through the slot which receives a locking handle. Rotation of the locking handle on the bolt displaces the locking handle inwardly to clamp the trunnion against the support member to lock the table top and prevent tilting movement thereof. The support member also includes a spring-loaded detent pin which engages stops on the trunnion to facilitate the orientation of the table top at predetermined angles relative to the horizontal, such as 45°.

A disadvantage which such a tilting mechanism is that only a single locking member is employed, so that the side of the table top proximate the pillow block and away from the trunnion may tilt slightly during use as, for example, when the operator bears down to hold a workpiece against the table. Another disadvantage is that, to lock the table top, the locking lever must engage the trunnion, which may result in the marring of the trunnion body along the arcuate slot. To obviate this marring, it may be necessary to fabricate the trunnion from a wear-resistant, and hence expensive, material.

Other examples of tilting tables are shown in the Goldschmidt U.S. Pat. No. 2,747,626 and the Parker et al. U.S. Pat. No. 3,282,309. Each of these patents discloses a multipurpose woodworking tool having a tiltable table in which the table top is supported by a pair of trunnions, each having its own separate locking mechanism of the type described in the Edgemond, Jr. et al. patent. However, while this type of locking mechanism provides additional stability since both pivoting connections are locked relative to the support member, the operator must perform an additional operation to lock the table and to release the table to change its orientation. Hence, there is an opportunity for the operator of the woodworking tool to neglect to lock one of the trunnions, resulting in a table which may tilt during use and thus ruin the cut being made upon a workpiece.

Accordingly, there is a need for a tilting table adapted to be used on a multipurpose woodworking tool which provides a rigid locking mechanism that minimizes the possibililty of the table tilting during use. Furthermore, there is a need for a table tilting mechanism in which a single lever can be actuated to effect the locking of two pivotal connections between the table and support member.

SUMMARY OF THE INVENTION

The present invention provides a tilting table for use with a multipurpose woodworking tool which possesses the ease of operation of those prior art devices having a single locking mechanism, yet provides the rigidity associated with those prior art devices having two locking mechanisms. Furthermore, the locking mechanism does not clamp the table supporting trunnion to the support member and thus does not gouge or mar the trunnion. As a result, the trunnion can be made from a relatively inexpensive and machinable material such as aluminum.

The tilting table of the present invention comprises a support member adapted to be mounted on a multipurpose woodworking tool, a pair of trunnions attached to the support member to pivot about a common axis, a table top attached to and supported by the trunnions, and a locking mechanism which engages each of the trunnions to prevent their movement relative to the support member. The locking mechanism consists of a pair of wedge blocks, each slidably engaging the support member and positioned to slidably engage a different one of the trunnions. The wedge blocks are joined by a rod which is fixedly attached to one wedge block and is slidably and rotatably attached to the other. A nut is threaded on the rod end adjacent the latter wedge block such that inward displacement of the nut by rotation causes the wedge blocks to be drawn toward each other, thereby jamming them between the trunnion and support member and locking the trunnion and table top to prevent movement relative to the support member.

The wedge blocks are biased outwardly away from jamming engagement by a pair of coil springs which are mounted on the rod and urge against seats formed in the support member. Thus, outward displacement of the nut on the rod allows the springs to urge the wedge blocks outwardly, thereby releasing the trunnions from locking engagement with the wedge blocks.

In a preferred embodiment, the trunnion adjacent the locking nut includes a spring-loaded detent pin which can be depressed inwardly to protrude from the trunnion and engage a bolt threaded to the support member. The bolt is positioned to be engaged by the detent pin when the table top is at a predetermined angular orientation, such as a horizontal orientation or an inclination of 45° to the horizontal. To release the detent pin from engagement with the set screw, the wedge blocks are released from locking engagement with the trunnions, and the table is moved slightly from its predetermined position, thereby allowing the detent pin to be withdrawn into the trunnion by the spring.

The preferred embodiment also includes a locking handle which is slidably and rotatably mounted on an outward extension of the lock nut, and includes a recess shaped to receive the flat faces of the lock nut. The locking lever can be displaced inwardly to engage the faces of the lock nut, thereby facilitating the rotation of the lock nut, or displaced outwardly to disengage the faces, so that it is not necessary to provide clearance beneath the table top for the locking handle to make a 360° rotation to drive the lock nut.

Accordingly, it is an object of the present invention to provide a tilting table for a woodworking tool having a locking mechanism which locks both pivoting members of a table support; a locking mechanism which can be locked or unlocked by movement of a single lever; and a tilting table having table top supporting trunnions which are not marred by a locking mechanism and may be made of a relatively inexpensive, easily machinable material.

Other objects and advantages of the present invention will be apparent from the following description, the accompanying drawings and the appended claims.

DESCRIPTION OF THE PREFERRED EMBODIMENT

Figure 1:
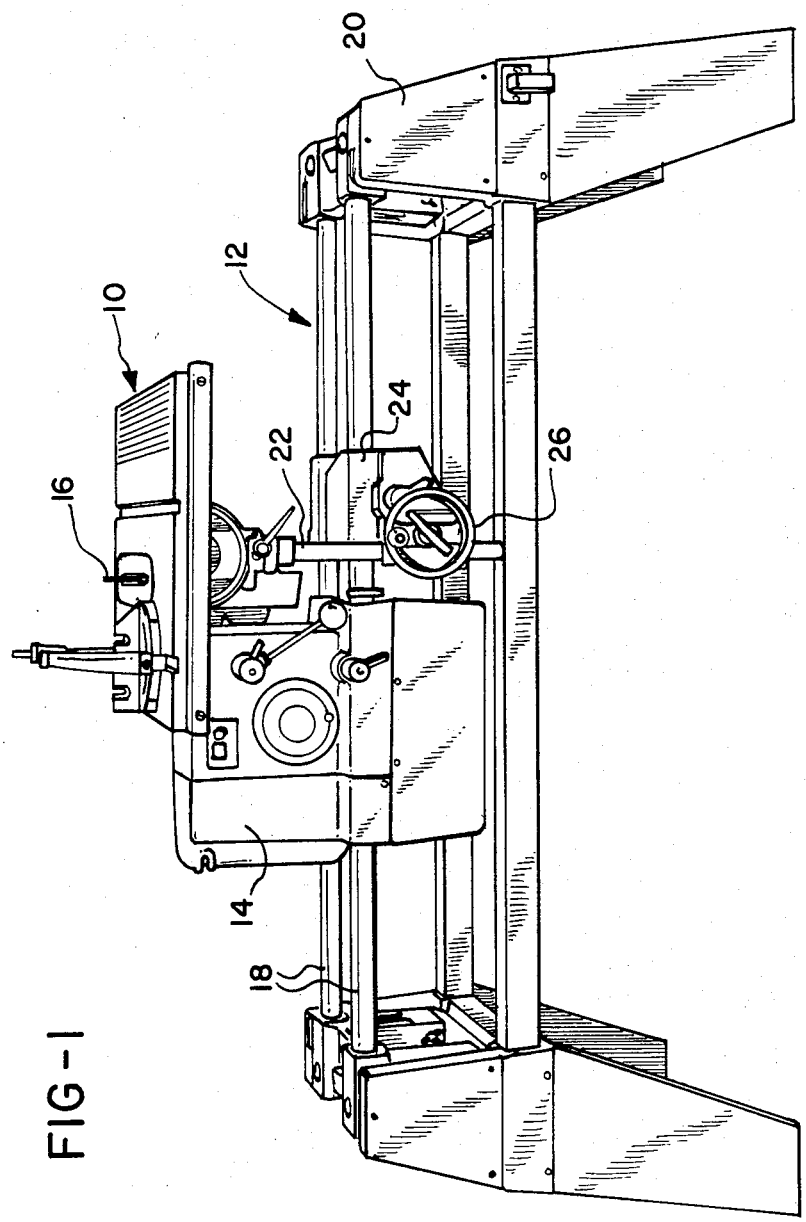
FIG. 1 is a side perspective view of a multipurpose woodworking tool incorporating the tilting table of the present invention.

As shown in FIG. 1, the tilting table of the present invention, generally designated 10, is adapted to be mounted on a multipurpose woodworking tool 12. The multipurpose woodworking tool 12 is of the type having a headstock 14 supporting a motor (not shown) which drives a circular saw blade 16 about a substantially horizontal axis of rotation. The headstock 14 is slidably mounted on a pair of parallel, horizontally extending rails 18 which are attached to a base frame 20.

The table 10 is attached to a pair of vertically oriented support legs 22 (see FIG. 2) which are racked to engage the elevating pinion (not shown) of a carriage 24 that is slidably mounted on the rails 18. Hand wheel 26 is operatively connected to the pinion so that rotation of the hand wheel causes the table 10 to be raised or lowered relative to the rails 18 and saw blade 16. The components of the multipurpose woodworking tool 12 and tilting table 10 described thus far are well-known in the art and are typical of many such high quality machines.

Figure 2:
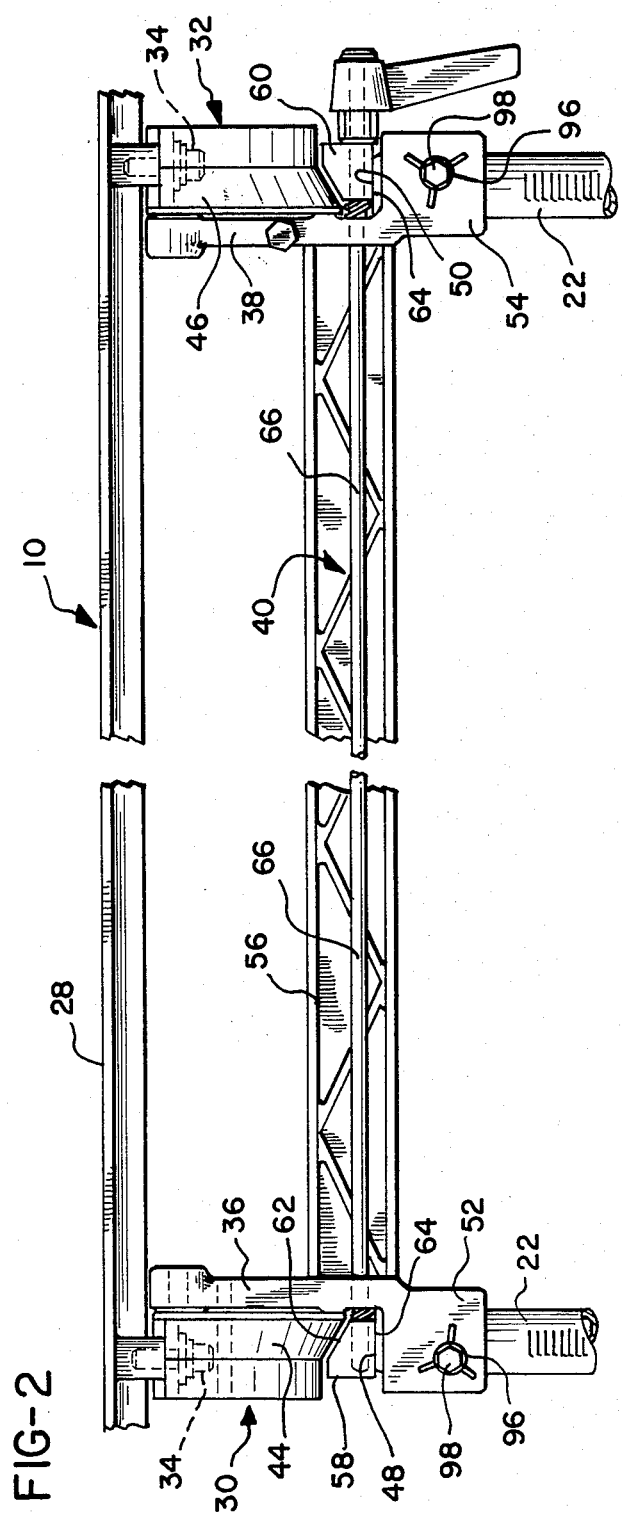
FIG. 2 is an elevation of the tilting table shown in FIG. 1 in which the central portion of the table is broken away.
Figure 3:
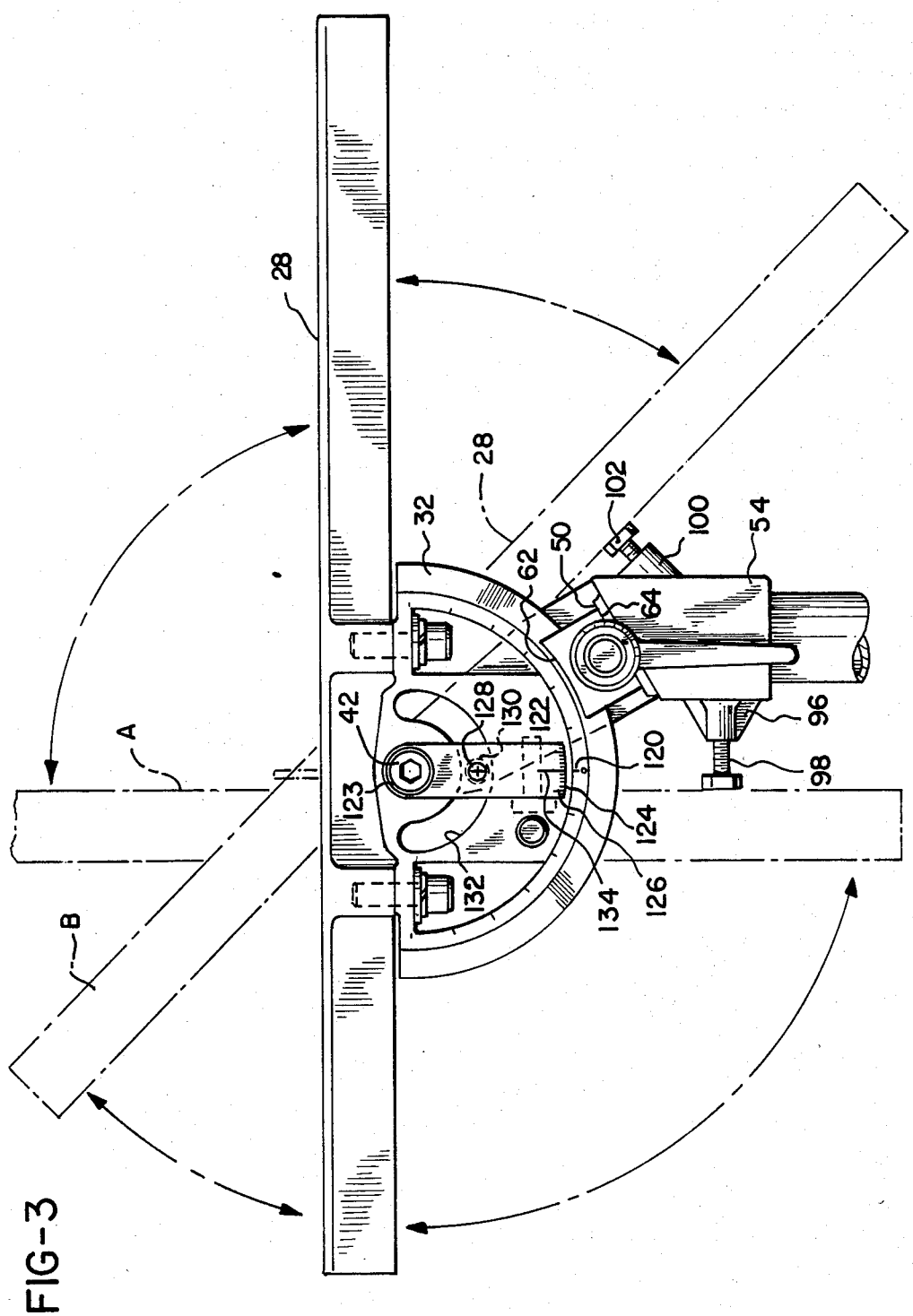
FIG. 3 is an end view of the tilting table shown in FIG. 2.
Figure 4:
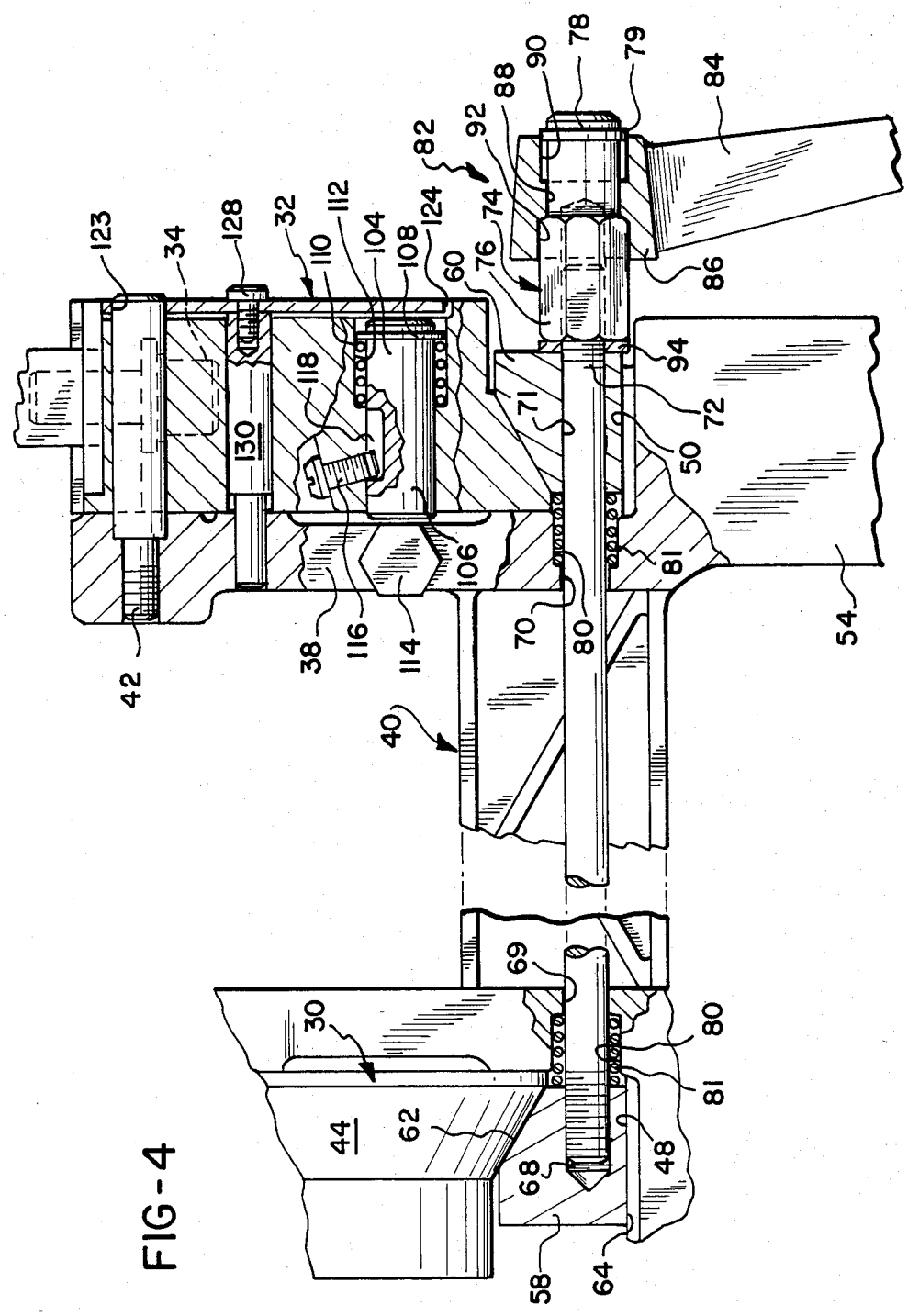
FIG. 4 is a detail of the tilting table of FIG. 2 showing the locking mechanism, and in which a trunnion is partially broken away.

As shown in FIGS. 2, 3 and 4, the table 10 includes a substantially rectangular shaped, flat table top 28 which is attached to a pair of trunnions 30, 32 by bolts 34. The trunnions 30, 32 are generally semicircular, as shown in FIG. 3 for trunnion 32, and are pivotally attached to the arms 36, 38 of a support member 40 by bolts 42. The trunnions 30, 32 each include semicircular, frusto-conical bearing surfaces 44, 46 extending about their outer, outboard peripheries.

The support member 40 includes horizontally extending bearing surfaces 48, 50 positioned directly beneath bearing surfaces 44, 46 of the trunnions 30, 32. As shown in FIGS. 1 and 2, the support member 40 also includes base portions 52, 54 which receive the support legs 22 and are joined by a cross member 56. To provide additional rigidity to the table 10, the entire support member 40 is preferably a unitary casting.

A wedge block 58 is positioned on bearing surface 48, and wedge block 60 is positioned on bearing surface 50. Wedge blocks 58, 60 each have an upper bearing surface 62 which is slightly concave in shape to matingly engage the frusto-conical bearing surfaces 44, 46 of the trunnions 30, 32, respectively. The wedge blocks 58, 60 also includes lower bearing surfaces 64 which slidably engage horizontal bearing surfaces 48, 50 of the support member 40.

As shown in FIGS. 2 and 4, a rod 66 is fixedly attached at an end to wedge block 58. Although any number of attaching methods may be employed, the method shown in the figure consists of threading the end of the rod 66 into a bore 68 within the wedge block 58, and securing it therein by the use of a suitable adhesive. The rod 66 extends through holes 69, 70, the support member 40, and through a bore 71 formed in wedge block 60. The rod 66 is sized such that the wedge block 60 is slidable relative to the rod, and the rod can be rotated relative to the wedge block. An end 72 of rod 66 adjacent wedge block 60 is threaded and receives a locking nut 74.

Locking nut 74 includes a hex-shaped portion 76 and an extension 78 having a recess adapted to receive a snap ring 79. The support member 40 includes recesses 80 which seat coil springs 81 that urge wedge blocks 58, 60 outwardly from the trunnions 58, 60.

A locking handle 82 includes a lever arm 84 which extending radially outwardly from a substantially cylindrical base 86. Base 86 includes a bore 88 which is sized such that the base may be positioned over the extension 78 of the locking nut 74. The bore 88 is countersunk at an outboard end 90 to receive the snap ring therein, thereby allowing the lever 82 to be displaced axially relative to the extension 78. The bore 88 is countersunk at an inboard end 92 to receive the hex-shaped portion 76 of the locking nut 74. Thus, the locking lever 82 can be displaced inwardly toward the support member 40, thereby drivingly engaging the hex portion 76 within the countersink 92, so that rotation of the locking lever also rotates the locking nut 74. Rotation of the locking nut 74 relative to the wedge block 60 is facilitated by a friction-reducing washer 94, positioned on the rod 66 between the locking nut and wedge block.

As shown in FIG. 3, the support member 40 includes bosses 96 extending outwardly from the base portions 52, 54 which receive adjusting screws 98 that serve as stops. The base portions 52, 54 also include angled bosses 100 (only one of which is shown in FIG. 3) which receive adjusting screws 102. The screws 98, 102 are adjusted relative to their respective bosses 96, 100 such that they provide stops for properly orienting the table top 28 in a substantially vertical orientation (shown in phantom as A in FIG. 3) or angled at 45° to the horizontal (also shown in phantom as B).

To facilitate orienting the table top 28 so that it is substantially horizontal and parallel with the rails 18 (FIG. 1) a detent mechanism is provided, best shown in FIG. 4. The detent mechanism includes a detent pin 104 which is slidably received within a bore 106 within the trunnion 32 and includes a snap ring 108 that captures a coil spring 110 carried on the pin and positioned within a seat 112. A screw 114 is threaded into the arm 38 of the support member 40, and is adjusted relative to the arm such that, when displaced inwardly such that an end protrudes from an inboard side of the trunnion 32, the detent pin 104 abuts the head of the screw 114 when the table top 28 is substantially horizontal.

Since the detent pin 104 is spring biased, it retracts into the trunnion 32 when it is moved out of abutment with the screw 114. The detent pin 104 is captured within the trunnion 32 by a set screw 116 which slidably engages a slot 118 formed on the body of the pin.

As shown in FIGS. 3 and 4, to facilitate the orientation of the table top 28 at angles other than those accommodated by the screws 98, 102, 114, the trunnion 32 is provided with indicia 120 on an outboard surface thereof, and a vernier plate 122 includes a hole 123 which is fitted over the bolt 42 retaining the trunnion to the leg 38, and includes a lower edge 124 having corresponding indicia 126 thereon. The vernier plate 122 is secured to the leg 38 of the support member 40 by a screw 128 which is threaded into a pin 130 that is press fitted into the leg 38. The pin 130 extends through an arcuate slot 132 formed in the trunnion 32. Each one of the indicia corresponds to the angle made with the horizontal by the table top 28, when the trunnion is pivoted about pins 42 to bring that indicia into registry with the center indicia 134 of the corresponding indicia 126 on the vernier plate 122.

In operation, the table top 28 is locked into position relative to the support member 40 by rotating the locking lever 82, which drives the locking nut 74 inwardly on the rod 66. This displacement of the locking nut 74 causes the wedge block 58 to be drawn toward the wedge block 60, which slides relative to the rod 66. This movement urges the wedge blocks inwardly toward the support member 40, thereby jamming them between the bearing surfaces 44, 46 of the trunnions 30, 32, and the bearing surfaces 48, 50 of the base portions 52, 54. When locked, as shown in FIG. 4, the trunnions are prevented from pivotal movement about the bolts 42, thereby maintaining the table top 28 in a stationary position.

To adjust the angular orientation of the table top 28, the locking lever 82 is rotated in a reverse direction, thereby backing the locking nut 74 outwardly away from the wedge block 60. This allows the coil springs 81 to urge the wedge blocks outwardly away from the legs 38 of the support member 40, and out of the jamming or locking engagement with the bearing surfaces 44, 46 of the trunnions 30, 32 and the bearing surfaces 48, 50 of the base portions 52, 54. The table top 28 can then be pivoted about bolts 42.

Since it is desired to minimize the overall height of the tilting table 10, and it is also desirable to provide a locking lever 82 with a lever arm that is sufficiently long to provide adequate leverage to a user, the locking lever may be disengaged from the hex portion 76 of the locking nut 74 so that the locking nut can be rotated more than 360°, without the lever arm having to clear the underside of the table top 28. Thus, a user may tighten the locking nut 74 with the locking lever 82 in much the same manner as he would use an open-ended wrench to tighten a nut on a bolt; that is, by repeatedly engaging the nut, swinging the wrench through a small arc, disengaging the wrench, then repeating the tightening motion through the same arc.

While the form of apparatus herein described constitutes a preferred embodiment of this invention, it is to be understood that the invention is not limited to this precise form of apparatus, and that changes may be made therein without departing from the scope of the invention.

What is claimed is:

1. A tilting table for a woodworking tool, comprising:
    a support member;
    a pair of trunnions attachd to said support member to pivot about a common axis;
    a table top attached to and supported by said trunnions;
    a rod slidably and rotatably attached to said support member;
    a first wedge block fixedly attached to an end of said rod and positioned between one of said trunnions and said support member;
    a second wedge block slidably and rotatably attached to said rod and positioned between the other of said trunnions and said support member; and
    nut means threaded on an opposite end of said rod such that rotation of said nut means draws said wedge blocks toward each other, thereby wedging each of said blocks between an associated one of said trunnions and said support member to prevent pivotal movement of said trunnions and table top.

2. The table of claim 1 wherein said trunnions each include an arcuate bearing surface extending about an outboard periphery thereof; said support member includes bearing surfaces adjacent each of said arcuate bearing surfaces; and each of said wedge blocks is positioned between and slidably engages different ones of said bearing surfaces of said trunnions and said support member.

3. A tilting table for a woodworking tool, comprising:
    a support member;
    a pair of trunnions attached to said support member to pivot about a common axis;
    said support member including bearing surfaces adjacent to each of said trunnions;
    said trunnions each including an arcuate bearing surface extending about an outboard periphery thereof, said arcuate bearing surface being frusto-conical in shape and disposed at an angle relative to an associated one of said support member bearing surfaces;
    a table top attached to and supported by said trunnions;
    a rod slidably and rotatably attached to said support member;
    a first wedge block fixedly attached to an end of said rod adjacent to one of said trunnions;
    a second wedge block slidably and rotatably attached to said rod adjacent to the other of said trunnions;
    each of said wedge blocks being positioned between and slidably engaging different ones of said bearing surfaces of said trunnions and of said support member; and
    nut means threaded on an opposite end of said rod such that rotation of said nut means draws said wedge blocks toward each other, thereby wedging each of said blocks between associated ones of said arcuate bearing surfaces to prevent pivotal movement of said trunnions and table top.

4. The table of claim 2 wherein said arcuate bearing surfaces are frusto-conical in shape and are disposed at an angle relative to an associated one of said support member bearing surfaces.

5. The table of claim 3 wherein said wedge blocks each include opposing bearing surfaces oriented thereon to matingly engage said bearing surfaces of said trunnions and said support member.

6. The table of claim 5 further comprising means for biasing said wedge blocks outwardly away from said trunnions, such that outward displacement of said nut means allows said wedge blocks to be displaced out of engagement with said arcuate bearing surfaces.

7. The table of claim 6 further comprising a handle, rotatably and slidably attached to said nut means, and having a recess therein adapted to receive and drivingly engage said nut means to effect rotation thereof relative to said rod.

8. The table of claim 7 further comprising detent means for repeatably pivoting said table top to a predetermined orientation relative to the horizontal.

9. The table of claim 8 wherein said detent means comprises a spring-loaded detent pin slidably attached to said trunnion adjacent said nut means and capable of manual displacement inwardly from said trunnion toward said support means; and stop means adjustably attached to said support means and positioned thereon to abut said inwardly displaced pin when said table is pivoted to said predetermined orientation.

10. The table of claim 9 further comprising indicia carried on said trunnion adjacent said handle; and vernier means, attached to said support means and stationary relative to said trunnions, having corresponding indicia thereon such that alignment of said indicia with said corresponding indicia indicates angular orientation of said table top.

11. The table of claim 10 wherein said vernier means includes an elongate vernier plate oriented substantially vertically and in a radial direction relative to said trunnion.

12. A tilting table for a woodworking tool, comprising:
a support member adapted to be mounted on a multipurpose woodworking tool;
a plate-shaped table top;
a pair of trunnions pivotally attached to said support member and fixedly attached to said table top such that said table top pivots relative to said support member;
wedge block means positioned between and slidably engaging each of said trunnions and adjacent portions of said support member; and
means attached to said wedge block means for simultaneously drawing said wedge block means into locking engagement with said trunnions and said support members, thereby preventing relative pivotal movement of said table top.

13. The table of claim 12 wherein said wedge block drawing means comprises:
a rod fixedly attached to a first one of said wedge block means, and slidably and rotatably attached to a second one of said wedge block means; and
nut means threaded on said rod adjacent said second wedge block means, such that inward displacement of said nut means on said rod draws said first and second wedge block means toward each other and into said locking engagement, and outward displacement of said nut means allows said wedge block means to be released from said locking engagement.

14. The table of claim 13 further comprising means for biasing said wedge block means outwardly from said locking engagement.

15. The table of claim 14 further comprising a handle, rotatably and slidably mounted on said rod, for engaging said nut means to facilitate manual rotation thereof.

16. A tilting table for a woodworking tool, comprising:
a support member adapted to be mounted on a woodworking tool and having bearing surfaces formed thereon;
a pair of trunnions attached to said support member to pivot about a common axis, said trunnions each including a frusto-conical, arcuate bearing surface extending about an outboard periphery thereof, said trunnions positioned such that a portion of said arcuate bearing surface faces and is angled relative to one of said bearing surfaces as said trunnion pivots;
a table top attached to and supported by said trunnions;
a rod slidably and rotatably attached to said support member;
a first wedge block fixedly attached to an end of said rod adjacent one of said trunnions;
a second wedge block slidably and rotatably attached to said rod adjacent the other of said trunnions;
said wedge blocks each including opposing bearing surfaces oriented to matingly engage adjacent ones of said bearing surfaces of said trunnions and of said support member;
means for biasing said wedge blocks outwardly away from engagement with said trunnions;
nut means threaded on an end of said rod opposite said first wedge such that rotation of said nut means in a first direction draws said wedge blocks toward each other, thereby wedging each of said blocks between adjacent ones of said arcuate bearing surfaces of said trunnions and said bearing surfaces of said support member to prevent pivotal movement of said trunnions, and rotation of said nut means in an opposite direction allows said biasing means to urge said blocks away from engagement with said arcuate bearing surfaces of said trunnions, thereby allowing pivotal movement of said trunnions;
a handle, rotatably and slidably attached to said nut means, and having a recess therein adapted to receive and drivingly engage said nut means to effect rotation thereof relative to said rod;
detent means for repeatably pivoting said table top to a predetermined orientation relative to the horizontal, said detent means including a spring-loaded detent pin slidably attached to one of said trunnions adjacent said nut means and capable of manual displacement inwardly from said one trunnion toward said support means, and stop means adjustably attached to said support means and positioned thereon to abut said inwardly displaced pin when said table is pivoted to said predetermined orientation;
indicia carried on said trunnion adjacent said handle; and
vernier means, attached to said support means and stationary relative to said trunnions, having corresponding indicia thereon such that alignment of said indicia with said corresponding indicia indicates angular orientation of said table top, said vernier means including an elongate vernier plate oriented substantially vertically and in a radial direction relative to said trunnion.

17. In a multipurpose woodworking tool of the type having a base frame, rails supported by said base frame, and a headstock slidably mounted on said rails, a tilting table comprising:
- a support member vertically adjustably mounted on said rails;
- a pair of trunnions attached to said support member to pivot about a common axis;
- a table top attached to and supported by said trunnions;
- a rod slidably and rotatably attached to said support member;
- a first wedge block fixedly attached to an end of said rod and positioned between one of said trunnions and said support member;
- a second wedge block slidably and rotatably attached to said rod and positioned between the other of said trunnions and said support member; and
- nut means threaded on an opposite end of said rod such that rotation of said nut means draws said wedge blocks toward each other, thereby wedging each of said blocks between an associated one of said trunnions and said support member to prevent pivotal movement of said trunnions and table top.

18. The table of claim 17 wherein said trunnions each include an arcuate bearing surface extending about an outboard periphery thereof; said support member includes bearing surfaces adjacent each of said arcuate bearing surfaces; and each of said wedge blocks is positioned between and slidably engages a different one of said bearing surfaces of said trunnions and said support member.

19. The table of claim 18 wherein said arcuate bearing surfaces are frusto-conical in shape and are disposed at an angle relative to an adjacent one of said support member bearing surfaces.

20. In a multipurpose woodworking tool of the type having a base frame, rails supported by said base frame, and a headstock slidably mounted on said rails, a tilting table comprising:
- a support member vertically adjustably mounted on said rails;
- a pair of trunnions attached to said support member to pivot about a common axis;
- said support member including bearing surfaces adjacent to each of said trunnions;
- said trunnions each including an arcuate bearing surface extending about an outboard periphery thereof, said arcuate bearing surface being frusto-conical in shape and disposed at an angle relative to an associated one of said support member bearing surfaces;
- a table top attached to and supported by said trunnions;
- a rod slidably and rotatably attached to said support member;
- a first wedge block fixedly attached to an end of said rod adjacent to one of said trunnions;
- a second wedge block slidably and rotatably attached to said rod adjacent to the other of said trunnions;
- each of said wedge blocks being positioned between and slidably engaging different ones of said bearing surfaces of said trunnions and of said support member; and
- nut means threaded on an opposite end of said rod such that rotation of said nut means drawn said wedge blocks toward each other, thereby wedging each of said blocks between associated ones of said arcuate bearing surfaces of said trunnions and said support member bearing surfaces to prevent pivotal movement of said trunnions and table top.

21. The table of claim 19 wherein said wedge blocks each include opposing bearing surfaces oriented thereon to matingly engage said bearing surfaces of said trunnions and said support member.

22. The table of claim 21 further comprising means for biasing said wedge blocks outwardly away from said trunnions, such that outward displacement of said nut means allows said wedge blocks to be displaced out of engagement with said arcuate bearing surfaces.

23. The table of claim 22 further comprising a handle, rotatably and slidably attached to said nut means, and having a recess therein adapted to receive and drivingly engage said nut means to effect rotation thereof relative to said rod.

24. The table of claim 23 further comprising detent means for repeatably pivoting said table top to a predetermined orientation relative to the horizontal.

25. The table of claim 21 wherein said detent means comprise a spring-loaded detent pin slidably attached to said trunnion adjacent said nut means and capable of manual displacement inwardly from said trunnion toward said support means; and stop means adjustably attached to said support means and positioned thereon to abut said inwardly displaced pin when said table is pivoted to said predetermined orientation.

26. The table of claim 25 further comprising indicia carried on said trunnion adjacent said handle; and vernier means, attached to said support means and stationary relative to said trunnions, having corresponding indicia thereon such that alignment of said indicia with said corresponding indicia indicates angular orientation of said table top.

27. The table of claim 26 wherein said vernier means includes an elongated vernier plate oriented substantially vertically and in a radial direction relative to said trunnion.

* * * * *

UNITED STATES PATENT AND TRADEMARK OFFICE
CERTIFICATE OF CORRECTION

PATENT NO. : 4,494,591

DATED : January 22, 1985

INVENTOR(S) : Harold E. Folkerth

It is certified that error appears in the above-identified patent and that said Letters Patent is hereby corrected as shown below:

Column 6, line 10, "attachd" should be --attached--.

Column 6, line 65, insert after "surfaces" --of said trunnions and said support member bearing surfaces--.

Column 10, line 14, "drawn" should be --draws--.

Signed and Sealed this

Sixth Day of August 1985

[SEAL]

Attest:

DONALD J. QUIGG

*Attesting Officer*   *Acting Commissioner of Patents and Trademarks*